(12) United States Patent
Ewers et al.

(10) Patent No.: US 12,245,574 B2
(45) Date of Patent: Mar. 11, 2025

(54) VIEW PORT FOR FISH STORAGE CONTAINER

(71) Applicant: Teak Isle Manufacturing, Inc., Ocoee, FL (US)

(72) Inventors: Donnie Ewers, Cocoa, FL (US); Pat Brown, Longwood, FL (US); Troy Roop, Apopka, FL (US)

(73) Assignee: Teak Isle Manufacturing, Inc., Ocoee, FL (US)

( * ) Notice: Subject to any disclaimer, the term of this patent is extended or adjusted under 35 U.S.C. 154(b) by 35 days.

(21) Appl. No.: 17/875,381

(22) Filed: Jul. 27, 2022

(65) Prior Publication Data

US 2024/0032512 A1  Feb. 1, 2024

(51) Int. Cl.
*A01K 63/02* (2006.01)

(52) U.S. Cl.
CPC ..................... *A01K 63/02* (2013.01)

(58) Field of Classification Search
CPC ......... B63B 19/02; B63B 19/08; B63B 19/14; B63B 19/00; B63B 35/26; A01K 63/02
USPC ...................... 119/226; 114/201 R
See application file for complete search history.

(56) References Cited

U.S. PATENT DOCUMENTS

| | | | | |
|---|---|---|---|---|
| 3,304,645 A | * | 2/1967 | Hardesty | A01K 97/05 43/55 |
| 4,026,082 A | * | 5/1977 | Crofoot | F24F 7/00 52/656.2 |
| 4,363,349 A | * | 12/1982 | Childs | E06B 5/08 160/90 |
| 4,748,765 A | * | 6/1988 | Martin | A01K 97/05 43/55 |
| 4,846,089 A | * | 7/1989 | Cedergreen | B63B 19/14 114/178 |
| 5,121,703 A | * | 6/1992 | Smith | B63B 19/02 296/147 |
| 5,231,948 A | * | 8/1993 | Malmanger | B63B 19/16 114/201 R |
| 5,284,105 A | * | 2/1994 | Wilkins | G02B 7/182 15/250.361 |
| 5,704,167 A | * | 1/1998 | Swinderman | E05D 15/502 16/229 |
| 5,758,593 A | * | 6/1998 | Kyle | B63B 19/08 49/386 |
| 5,842,433 A | * | 12/1998 | Kyle | B63B 19/08 114/173 |

(Continued)

OTHER PUBLICATIONS

Robalo livewell R240, "Robalo livewell R240—FS Livewell Clear Lids—The Hull Truth—Boating and Fishing Forum", Sep. 25, 2019 [online], <URL: https://www.thehulltruth.com/parts-forum/1032163-fs-livewell-clear-lids.html> (Year: 2019).*

(Continued)

*Primary Examiner* — Brady W Frazier
*Assistant Examiner* — Zoe Tam Tran
(74) *Attorney, Agent, or Firm* — Taft Stettinius & Hollister LLP

(57) ABSTRACT

A view port for an access door for a fish storage container. The view port includes a first support body adapted to couple to the fish storage access door, and a transparent or translucent body coupled to the first support body. The view port may include a second support body adapted to couple to the fish access door.

24 Claims, 9 Drawing Sheets

(56) References Cited

U.S. PATENT DOCUMENTS

| | | | | |
|---|---|---|---|---|
| 6,334,277 B1* | 1/2002 | Condino | ................... | E06B 3/72 |
| | | | | 16/256 |
| 7,028,629 B2* | 4/2006 | Walcome | ................ | B63B 19/00 |
| | | | | 114/173 |
| 7,162,831 B1* | 1/2007 | Morton | ................ | A01K 63/045 |
| | | | | 119/261 |
| 7,536,969 B2* | 5/2009 | Kyle | ....................... | B63B 19/21 |
| | | | | 114/201 R |
| 9,477,021 B2* | 10/2016 | Gross | ................... | C03C 17/3644 |
| 11,525,296 B1* | 12/2022 | Martin | .................... | B63B 35/26 |
| 2007/0186836 A1* | 8/2007 | Tipton | .................... | B63B 35/14 |
| | | | | 114/255 |
| 2008/0216731 A1* | 9/2008 | Huddleston | ............. | B63B 19/24 |
| | | | | 292/262 |
| 2020/0291241 A1* | 9/2020 | Foley | ..................... | C09D 5/004 |

OTHER PUBLICATIONS

Robalo Lid R240 Product p. 2019, <URL: https://www.greatlakesskipper.com/robalo-boat-livewell-lid-22-19567-r240-27-1-4-inch-starboard> (Year: 2019).*

Hendricks, Jim, Boat Review: SeaVee 370Z, Apr. 23, 2015, URL: <https://www.saltwatersportsman.com/boat-review-seavee-370z/> (Year: 2015).*

Teak Isle MFG, Exceeding Customer Expectations, "Baitwell Lids," https://www.teakisle.com/products_baitwell_lids.asp, 4 pages.

* cited by examiner

VIEW PORT FOR FISH STORAGE CONTAINER

TECHNICAL FIELD OF THE INVENTION

The present invention relates generally to a view port for a fish storage container, such as a live well.

BACKGROUND OF THE INVENTION

Fish storage containers are typically used on fishing boats to store live bait and caught fish. An example of a fish storage container is a livewell. A livewell is an tank or other storage container with water that is aerated and/or circulated and located on a boat. Fish, typically caught while on the boat, can be temporarily stored in the livewell and have a better chance of survival due to aeration and/or circulation. For tournament fishing, keeping fish alive until weigh-in is important, because dead fish result in penalties.

Typically on bass boats and aluminum boats, livewell access doors are made from opaque fiberglass or aluminum. Livewells are typically installed in the deck of the boat, and thus the access doors are typically walked on by the fisherman and thus must be strong enough to hold the weight of the fisherman and gear. However, with these conventional livewells, due to the opaque access doors, fishermen must repeatedly open the access door to check on the well-being of the stored fish and proper operation of the livewell oxygenation or circulation pumps. This repeated opening of the access door is time consuming, and can also increase the temperature of the water being recirculated in the livewell or allow fish to jump out of the livewell. Moreover, some fish are sensitive to the water temperature fluctuations, therefore maintaining the water temperature at a desired temperature is important to the well-being of the caught fish. In addition, the sudden influx of light caused by opening the opaque access door can cause stress on the fish.

SUMMARY OF THE INVENTION

The present invention relates broadly to a translucent or transparent view port for a fish storage container. The view port can be installed in an access door or other exterior facing wall of the storage container. The view port allows a fisherman to visually inspect the well-being of fish in the storage container without requiring the access door to be opened. Moreover, since the view port is translucent or transparent, it allows light into the storage container, which further minimizes stress on the fish, while still minimizing heat transfer. In an embodiment, the view port is incorporated in the access door, and does not compromise the structural integrity of the access door, such that the access door and the viewing port are strong enough to allow them to be walked on and support the weight of the fisherman and fishing gear. The tint of the view port can be chosen to provide a calming environment for the fish.

In an embodiment, the present invention broadly comprises an access door for a fish storage container. The access door includes a view port including a first support body coupled to the fish storage access door, and a view body coupled to the first support body. The view body is composed of a transparent or translucent material.

In another embodiment, the present invention broadly comprises a view port for a fish storage access door. The view port includes a first support body adapted to couple to the fish storage access door, and a view body coupled to the first support body. The view body is composed of a transparent or translucent material.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
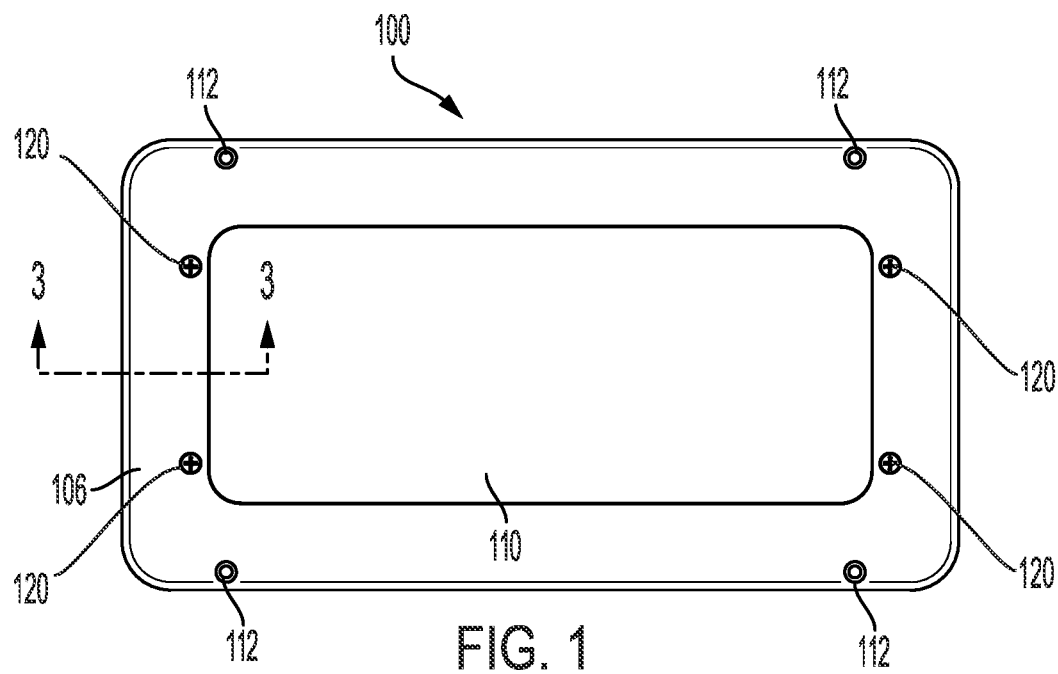
FIG. 1 is a front view of a view port, according to an embodiment of the present invention.
Figure 2:
FIG. 2 is a side view of the view port of FIG. 1.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to a view port for a fish storage container. The view port can be installed in an access door or other exterior facing wall of the storage container. The view port allows a fisherman to visually inspect the well-being of fish in the storage container without requiring the access door to be opened. Moreover, since the view port is translucent or transparent, it allows light into the storage container, which further minimizes stress on the fish, while still minimizing heat transfer. In an embodiment, the view port is incorporated in the access door, and does not compromise the structural integrity of the access door, such that the access door and the viewing port are strong enough to allow them to be walked on and support the weight of the fisherman and fishing gear. The tint of the view port can be chosen to provide a calming environment for the fish.

Figure 7:
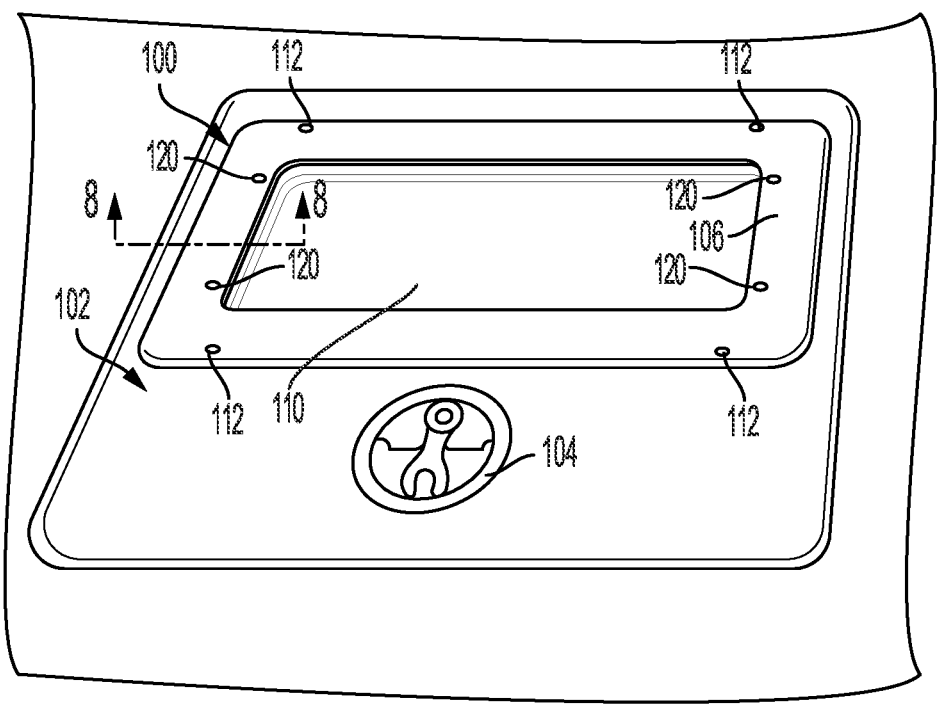
FIG. 7 is a perspective view of the view port of FIG. 1 in use with an exemplary fish storage access door enclosing a livewell.
Figure 8:
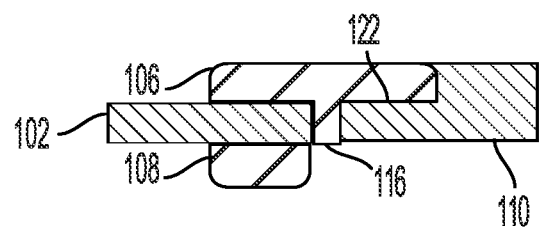
FIG. 8 is a section view of the view port taken along line 8-8 of FIG. 7.
Figure 9:
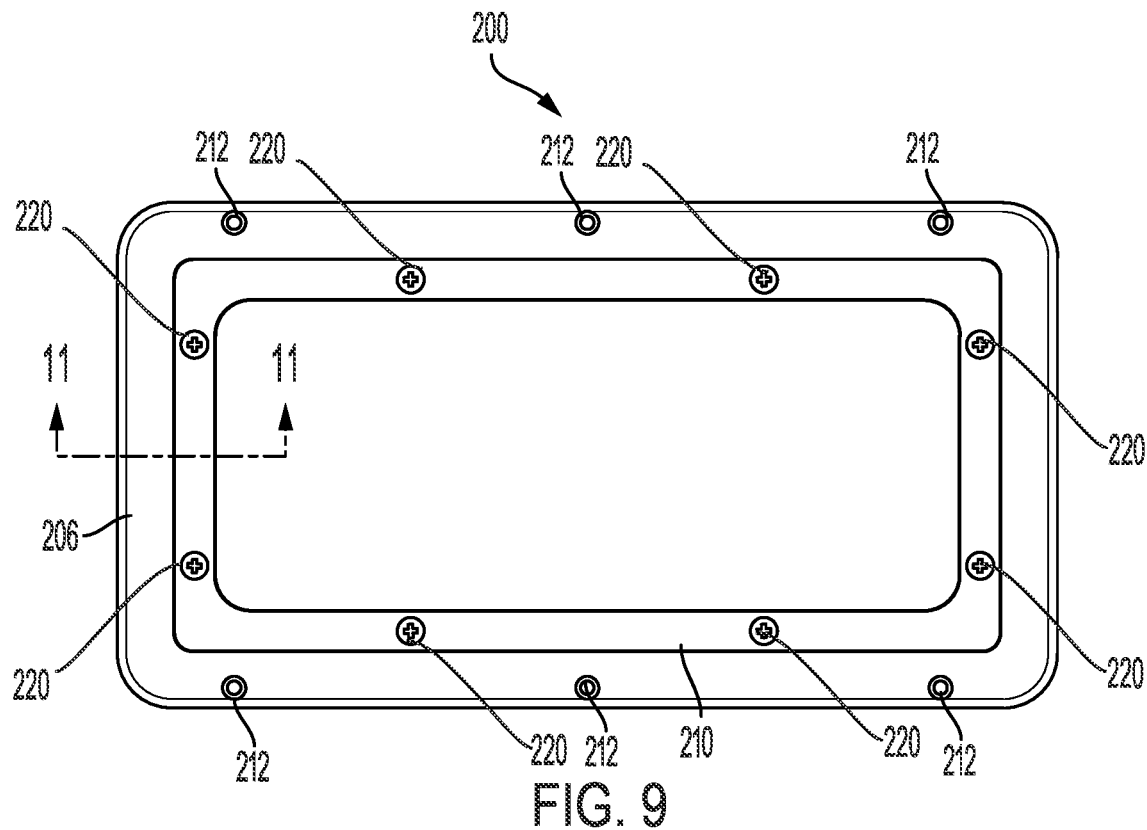
FIG. 9 is a front view of a view port, according to another embodiment of the present invention.
Figure 10:
FIG. 10 is a side view of the view port of FIG. 9.

Referring to FIGS. 1-8, a view port 100 adapted to couple to a fish storage access door 102 is shown. In an embodiment, the fish storage access door 102 selectively closes a fish storage container, such as, for example, a livewell (as illustrated in FIG. 7), baitwell, etc., disposed on a boat. In an embodiment, the fish storage access door 102 is made from steel, aluminum, or fiberglass and selectively retained in a closed position by a latch 104. The view port 100 includes first 106 and second 108 support bodies and a view body 110. The first 106 and second 108 support bodies are respectively disposed on opposing sides of the fish storage access door 102. In other words, the fish storage access door 102 is sandwiched between the first 106 and second 108 support bodies.

The first support body 106 includes first support body apertures 112 adapted to receive fasteners, such as for example, screws, rivets, pins, etc. to couple the first support body 106 to the fish storage access door 102. Although four first support body apertures 112 are illustrated, it will be understood that the present invention is not limited as such, and any suitable number of apertures may be used. In an alternate embodiment (not shown), the first support body 106 is coupled to the fish storage access door 102 without fasteners, such as, for example, using adhesive or welding. In this embodiment, the first support body apertures 112 would not be needed. In an embodiment, the first support body 106 includes a rib 116 that provides additional structural support to the view port 100. The rib 116 is disposed between the view body 110 and the fish storage access door 102. The first support body 106 is composed of a high density polyethylene, aluminum, or any other suitable plastic or metal.

The second support body 108 includes second support body apertures 114 adapted to receive fasteners, such as for example, screws, rivets, pins, etc., to couple the second support body 108 to the first support body 106 and the fish storage access door 102. Although four second support body apertures 114 are illustrated, it will be understood that the present invention is not limited as such and any suitable number of apertures may be used. In an alternate embodiment, not shown, the second support body 108 is coupled to the fish storage access door 102 without fasteners, such as, for example, using adhesive or welding. In this embodiment, the second support body apertures 114 would not be needed. In an embodiment, the second support body 108 is composed of a high density polyethylene, aluminum, or any other suitable plastic or metal.

Figure 3:
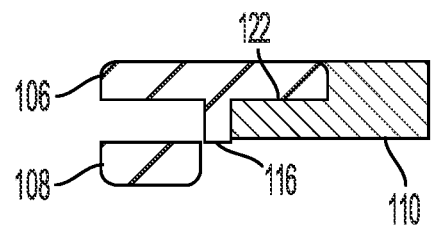
FIG. 3 is a section view of the view port taken along line 3-3 of FIG. 1.
Figure 4:
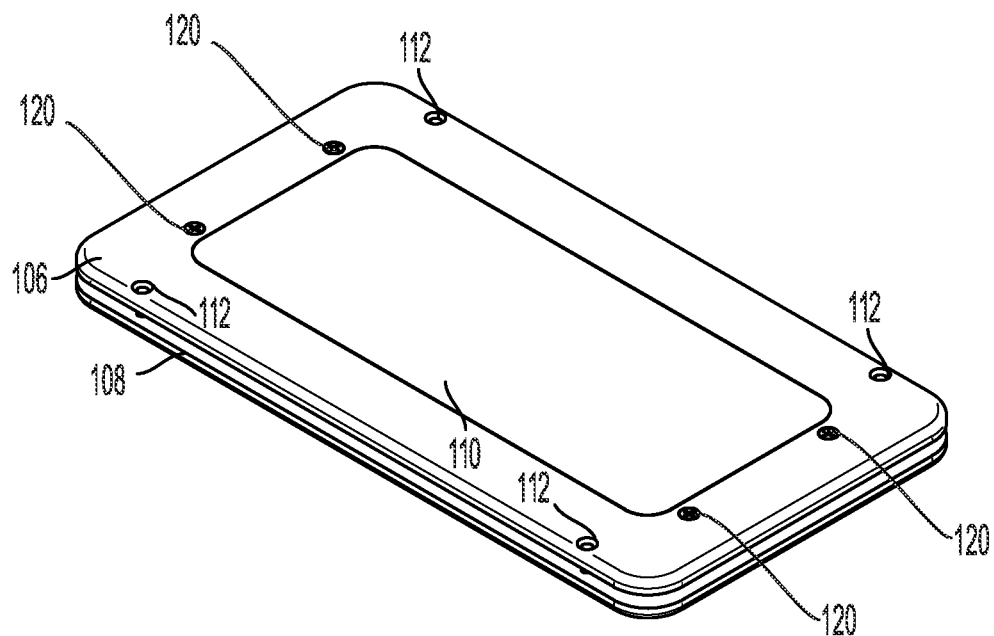
FIG. 4 is a first perspective, assembled view of the view port of FIG. 1.
Figure 5:
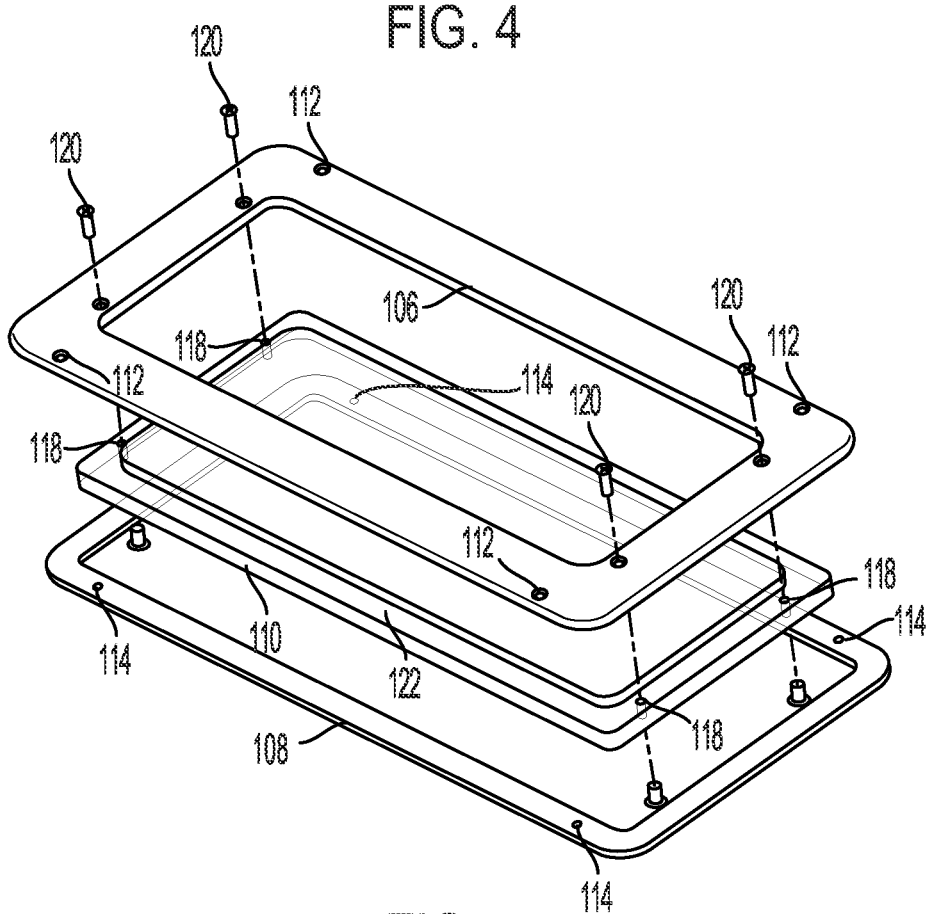
FIG. 5 is a perspective, disassembled view of the view port of FIG. 1.
Figure 6:
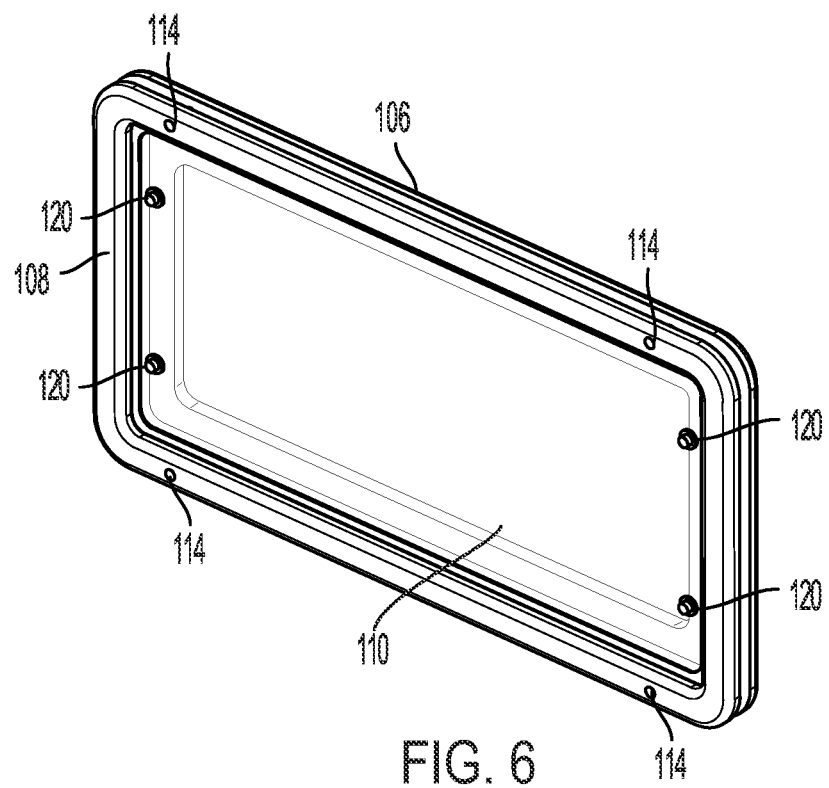
FIG. 6 is a second perspective, assembled view of the view port of FIG. 1.

The view body 110 is transparent or translucent and is coupled to the first support body 106 to allow visual inspection of the contents of the fish storage container. The view body 110 includes a recess 122 disposed around the periphery of the view body 110 and adapted to receive the first support body 106. The recess 122 allows the view body to be substantially flush with the first support body 106, as best illustrated in FIG. 3. In an embodiment, the view body 110 includes view body apertures 118 that respectively receive fasteners 120 to couple the view body 110 to the first support body 106. Although the fasteners 120 are illustrated as threaded fasteners that threadably couple to threaded inserts, it will be understood that the present invention is not limited as such, and the fasteners 120 may be any of screws, rivets, pins, etc. In an alternate embodiment (not shown), the view body 110 is coupled to the first support body 106 without fasteners, such as, for example, using adhesive.

Referring to FIGS. 9-13, a view port 200 adapted to couple to a fish storage access door, such as the fish storage access door 102 that is described above, is shown according to another embodiment. The view port 200 includes first 206 and second 208 support bodies and a view body 210. The first 206 and second 208 support bodies are adapted to be respectively disposed on opposing sides of a fish storage access door, such as the fish storage access door 102 that is described above.

The first support body 206 is substantially similar to the first support body 106 described above. However in this embodiment, the first support body 206 does not include the rib 116 and includes a rim 224. The first support body 206 further includes first support body apertures 212 adapted to receive fasteners, such as for example, screws, rivets, pins, etc. to couple the first support body 206 to a fish storage access door, such as the fish storage access door 102 that is described above. Although six first support body apertures 212 are illustrated, it will be understood that the present invention is not limited as such, and any suitable number of apertures may be used. In an alternate embodiment (not shown), the first support body 206 is coupled to the fish storage access door without fasteners, such as, for example, using adhesive or welding. In this embodiment, the first support body apertures 212 would not be needed. The first support body 206 is composed of a high density polyethylene, aluminum, or any other suitable plastic or metal.

The second support body 208 is substantially similar to the second support body 108 described above. The second support body 208 includes second support body apertures 214 adapted to receive fasteners, such as for example, screws, rivets, pins, etc., to couple the second support body 208 to the first support body 206 and the fish storage access door. Although six second support body apertures 214 are illustrated, it will be understood that the present invention is not limited as such and any suitable number of apertures may be used. In an alternate embodiment, not shown, the second support body 208 is coupled to the fish storage access door without fasteners, such as, for example, using adhesive or welding. In this embodiment, the second support body apertures 214 would not be needed. The second support body 208 is composed of a high density polyethylene, aluminum, or any other suitable plastic or metal.

Figure 11:
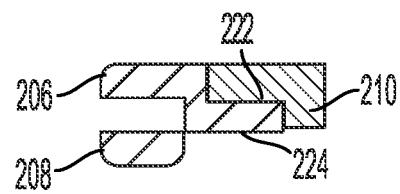
FIG. 11 is a section view of the view port taken along line 11-11 of FIG. 9.
Figure 12:
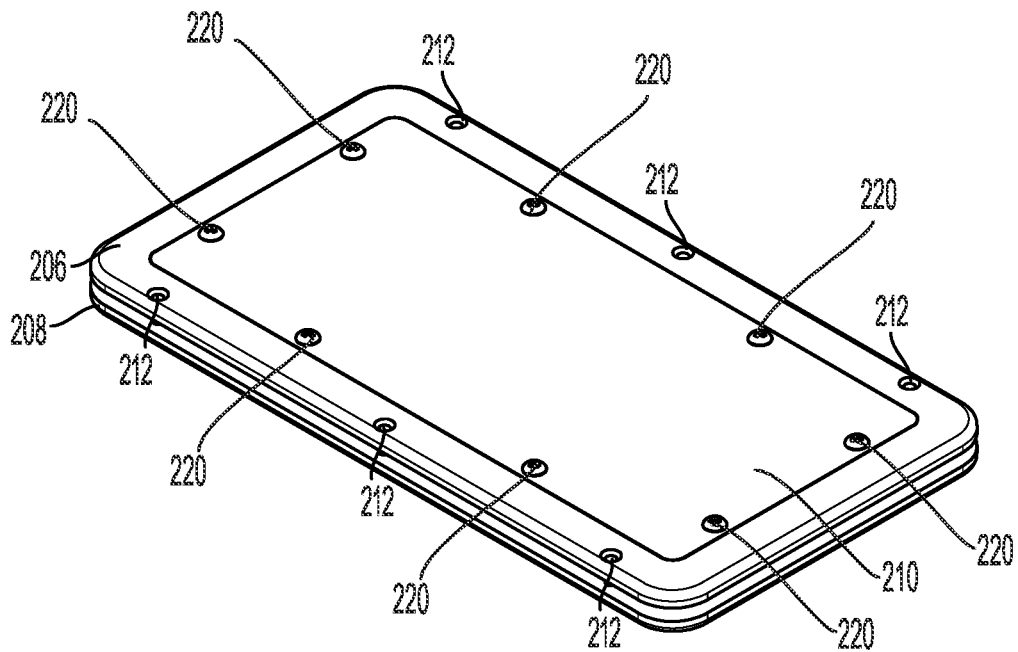
FIG. 12 is a first perspective, assembled view of the view port of FIG. 9.
Figure 13:
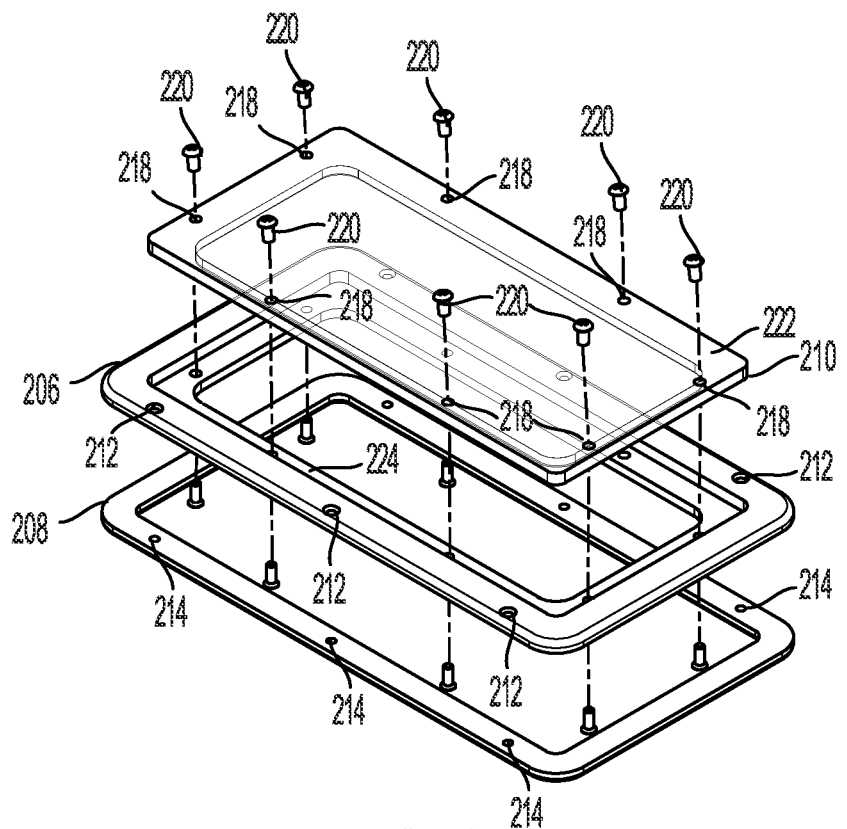
FIG. 13 is a perspective, disassembled view of the view port of FIG. 9.
Figure 14:
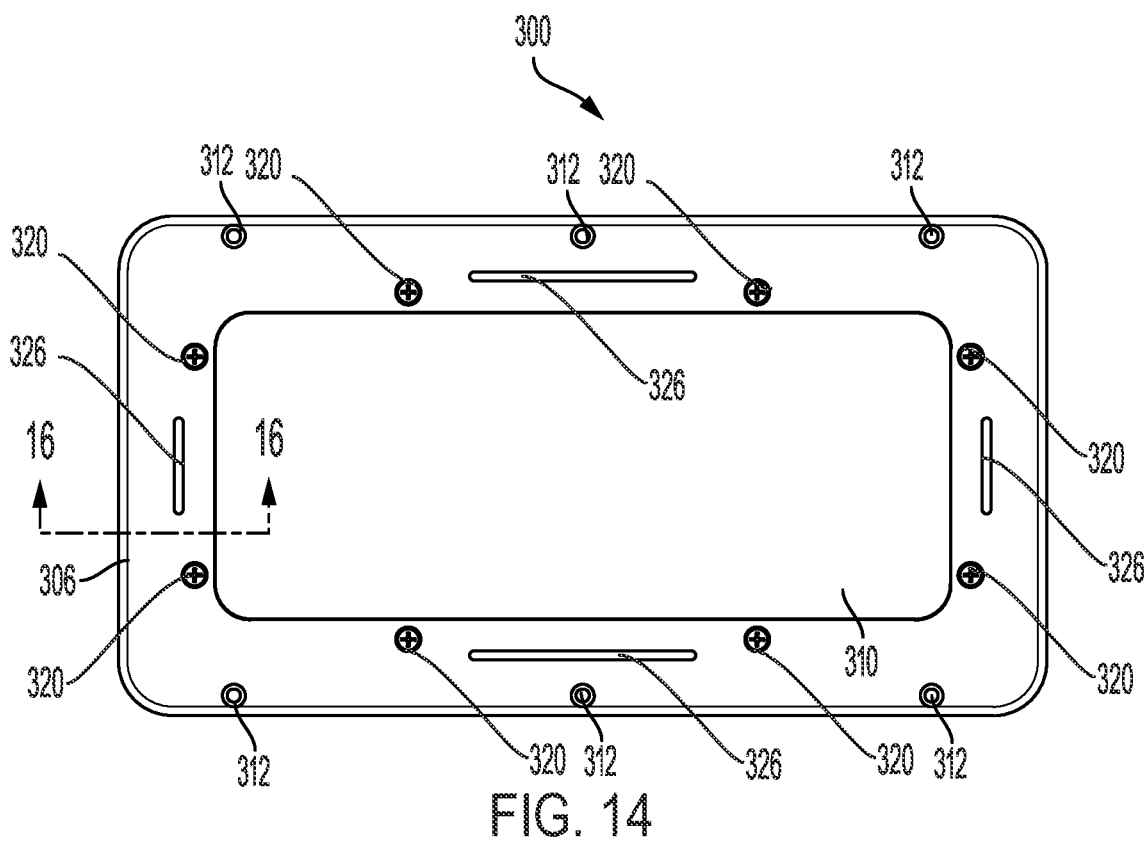
FIG. 14 is a front view of a view port, according to another embodiment of the present invention.
Figure 15:
FIG. 15 is a side view of the view port of FIG. 14.

The view body 210 is substantially similar to the view body 110 described above. However, in this embodiment, the view body 210 includes a recess 222 that receives the rim 224. As compared to the recess 122 described above, the recess 222 is disposed on an opposite side of the view body 210. The recess 222 allows the view body 210 to be substantially flush with the first support body 206, as best illustrated in FIG. 11. In an embodiment, the view body 210 includes view body apertures 218 that respectively receive fasteners 220 to couple the view body 210 to the first support body 206. Although the fasteners 220 are illustrated as threaded fasteners that threadably couple to threaded inserts, it will be understood that the present invention is not limited as such, and the fasteners 220 may be any of screws, rivets, pins, etc. In an alternate embodiment (not shown), the view body 210 is coupled to the first support body 206 without fasteners, such as, for example, using adhesive.

Referring to FIGS. 14-19, a view port 300 adapted to couple to a fish storage access door, such as the fish storage access door 102 that is described above, is shown according to another embodiment. The view port 300 includes first 306 and second 308 support bodies and a view body 310. The first 306 and second 308 support bodies are adapted to be respectively disposed on opposing sides of the fish storage access door, such as the fish storage access door 102 that is described above.

The first support body 306 is substantially similar to the first support body 106 described above. However in this embodiment, the first support body 306 includes one or more first support body ventilation apertures 326. The first support body ventilation apertures 326 allow air to pass therethrough to reduce condensation and permit harmful metabolic gases from fish to escape. Although four first support body ventilation apertures 326 are illustrated, it will be understood that the present invention is not limited as such, and any suitable number of apertures may be used. The first support body 306 further includes first support body apertures 312 adapted to receive fasteners, such as for example, screws, rivets, pins, etc. to couple the first support body 306 to a fish storage access door, such as the fish storage access door 102 that is described above. Although six first support body apertures 312 are illustrated, it will be understood that the present invention is not limited as such, and any suitable number of apertures may be used. In an alternate embodiment (not shown), the first support body 206 is coupled to the fish storage access door without fasteners, such as, for example, using adhesive or welding. In this embodiment, the first support body apertures 312 would not be needed. In an embodiment, the first support body 306 includes a rib 316 that provides additional structural support to the view port 300. The rib 316 is disposed between the view body 310 and the fish storage access door. The first support body 306 is composed of a high density polyethylene, aluminum, or any other suitable plastic or metal.

The second support body 308 is substantially similar to the second support body 108 described above. The second support body 308 includes second support body apertures 314 adapted to receive fasteners, such as for example, screws, rivets, pins, etc., to couple the second support body 308 to the first support body 306 and the fish storage access door. Although six second support body apertures 314 are illustrated, it will be understood that the present invention is not limited as such and any suitable number of apertures may be used. In an alternate embodiment, not shown, the second support body 308 is coupled to the fish storage access door without fasteners, such as, for example, using adhesive or welding. In this embodiment, the second support body apertures 314 would not be needed. The second support body 308 is composed of a high density polyethylene, aluminum, or any other suitable plastic or metal.

Figure 16:
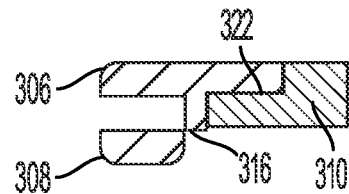
FIG. 16 is a section view of the view port taken along line 16-16 of FIG. 14.
Figure 17:
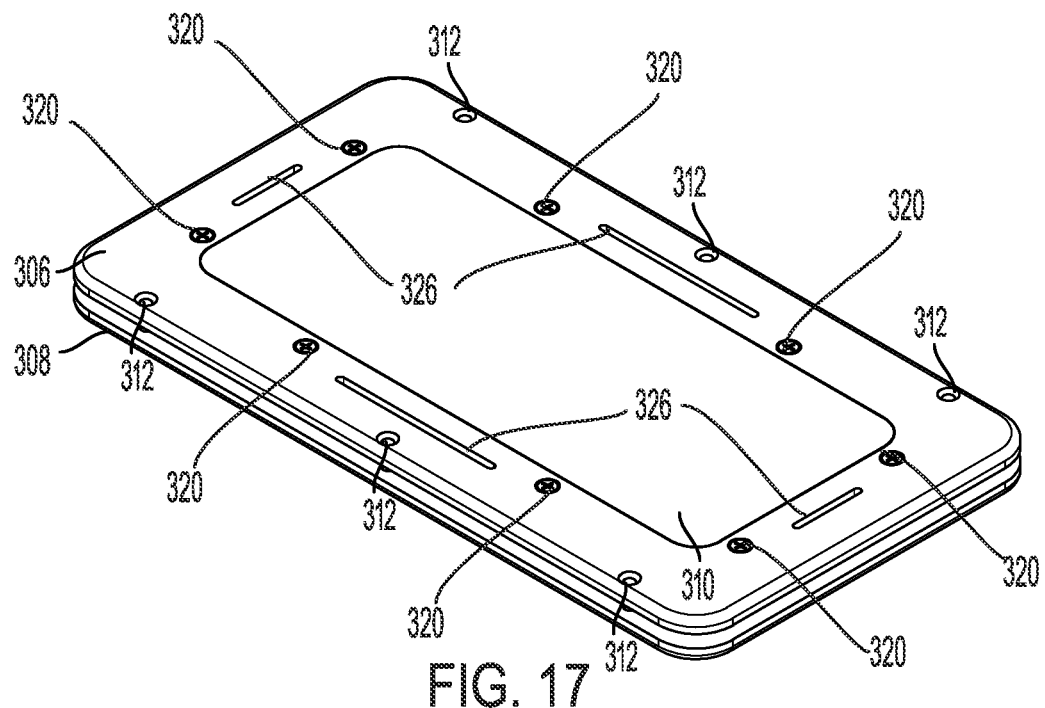
FIG. 17 is a first perspective, assembled view of the view port of FIG. 14.
Figure 18:
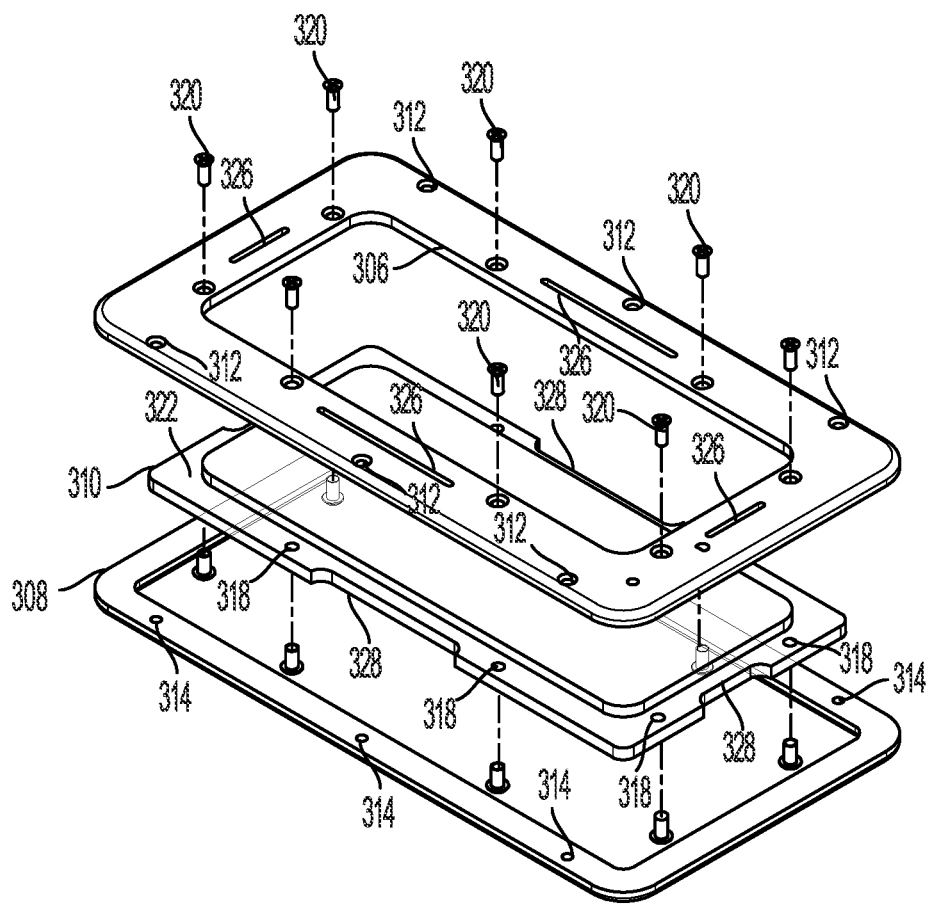
FIG. 18 is a perspective, disassembled view of the view port of FIG. 14.
Figure 19:
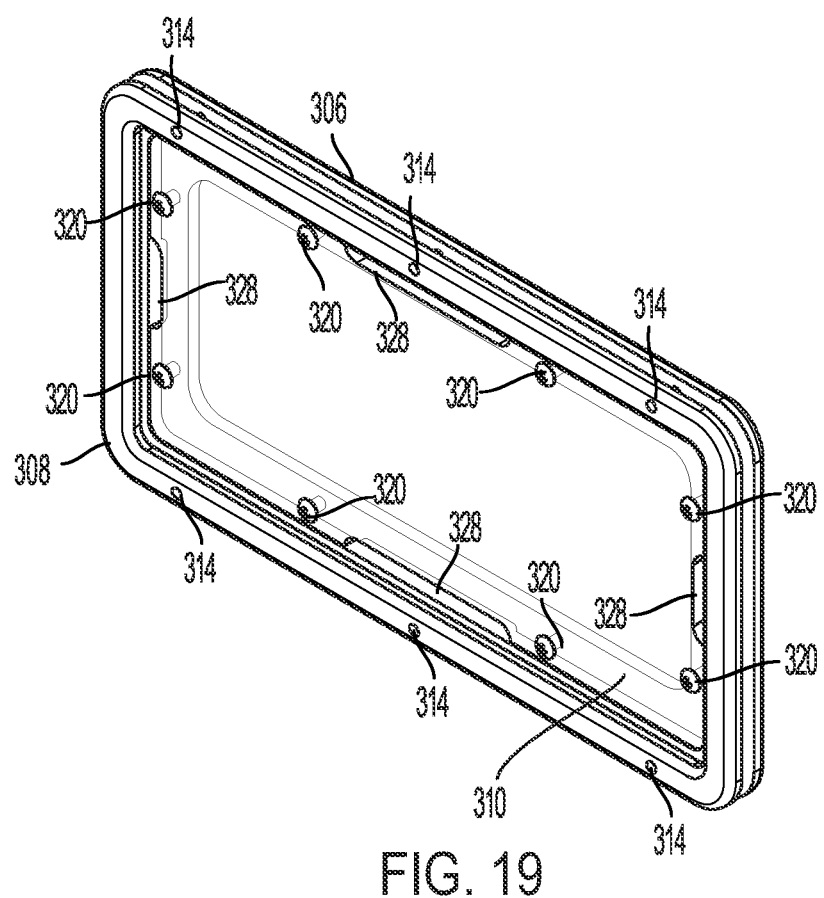
FIG. 19 is a second perspective, assembled view of the view port of FIG. 14.

The view body 310 is substantially similar to the view body 110 described above. However, in this embodiment, the view body 310 includes view body ventilation cutouts 328. The view body ventilation cutouts 328 correspond with the first support body ventilation apertures 326 to allow air to pass therethrough, thereby reducing condensation and permitting harmful metabolic gases from fish to escape. Although four view body ventilation cutouts 328 are illustrated, the invention is not limited as such and any suitable number of cutouts may be used. The view body 310 can also include a recess 322 disposed around the periphery of the view body 310 and adapted to receive the first support body 306. The recess 322 allows the view body 310 to be substantially flush with the first support body 306, as best illustrated in FIG. 16. In an embodiment, the view body 310 includes view body apertures 318 that respectively receive fasteners 320 to couple the view body 310 to the first support body 306. Although the fasteners 320 are illustrated as threaded fasteners that threadably couple to threaded inserts, it will be understood that the present invention is not limited as such, and the fasteners 320 may be any of screws, rivets, pins, etc. In an alternate embodiment (not shown), the view body 310 is coupled to the first support body 306 without fasteners, such as, for example, using adhesive.

The view body 110, 210, 310 is composed of transparent or translucent glass or plastic, such as for example, acrylic or polycarbonate. The view body 110, 210, 310 material can include heat blocking and reflective properties to control sunlight penetration to restrict the fish storage container from increasing temperature as a result of Infrared Radiation generated by sunlight. For example, the view body 110, 210, 310 can include reflective particles, such as for example, nanoparticles, that reflect and block approximately 50% of Infrared Radiation generated by sunlight. In this embodiment, the view body 110, 210, 310 can be a cast acrylic such as Piedmont Marine Grade® HR™ (Heat Reflective) made by Piedmont Plastics. In another embodiment, the view body 110, 210, 310 is tinted to control light and heat penetration to calm the fish. For example, blue has been found to have a calming effect on fish. However, any suitable colored tint may be used. In an embodiment, the view body 110, 210, 310 can darken when exposed to ultraviolet rays from sunlight, thereby allowing the level of tint to adjust in response to the lighting conditions.

In an embodiment, the view body 110, 210, 310 includes a fog restrictive coating applied to one or both opposing sides of the view body 110, 210, 310. The fog restrictive coating is adapted to restrict fogging and condensation and also provides scratch resistance. An example of a fog restrictive coating according to this embodiment is TEC 2000 ANTI FOG made by ACP Noxtat, Inc. In an embodiment, a side of the view body 110, 210, 310 that is disposed outside of the fish storage container can have a harder coating to restrict scratching of the view body 110, 210, 310. In another embodiment, the view body 110, 210, 310 has an ultraviolet coating.

The view port 100, 200 may also include one or more seals sandwiched between the first 106, 206 and second support bodies 108, 208 and/or around the view body 110, 210 to form a water tight seal between the view port 100, 200 and the fish storage access door 102. Additionally, although the first 106, 206, 306 and second 108, 208, 308 support bodies and the view body 110, 210, 310 have a substantially rectangular shape, it will be understood that the present invention is not limited as such, and any suitable shape and/or size adapted to fit inside a corresponding opening in the fish storage access door 102 can be used.

The view port 100, 200, 300 can be installed as a modification to an existing fish storage container, or be incorporated into the fish storage container at the time or manufacture. For installation as a modification, first a hole would need to be cut into the fish storage access door 102. After the view body 110, 210, 310 is coupled to the first support body 106, 206, 306, the first support body 106, 206, 306 is coupled to one side the fish storage access door 102 using one of the methods described above. The second support body 108, 208, 308 is then coupled to an opposing side of the fish storage access door 102 using one of the methods described above.

While the view port 100, 200 is described as being coupled to the fish storage access door 102, it will be understood that the present invention is not limited as such, and the view port 100, 200 can be coupled to any exterior facing wall of the fish storage container. The view port 100, 200 may also include one or more seals sandwiched between the first 106, 206 and second 108, 208 support bodies and/or around the view body 110, 210 to form a water tight seal with the exterior facing wall of the fish storage container. This allows the view port 100, 200 to be submerged in water in the fish storage container. In other embodiments, the view body 110, 210 may also be molded into the exterior facing wall of the fish storage container, or formed as a monolithic piece of the fish storage container. When the view body 110, 210 is incorporated into an exterior facing wall of the fish storage container and positioned to be submerged in water in the fish storage container, fogging may be less of an issue and the fog restrictive coating may be optional. In other embodiments the fish storage access door 102 is a single piece lid with the view body 110, 210, 310 molded thereto.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An access door for a fish storage container, the access door comprising:
    a door body having opposing first and second surfaces and a door body aperture; and
    a view port disposed in the door body aperture and including:
        a first support body having a first perimeter portion disposed on the first surface of the door body;
        a view body disposed in the door body aperture and coupled to the first support body, wherein the view body is composed of a transparent or translucent material and includes a recess that is adapted to receive the first support body to allow an exterior surface of the view body to be substantially flush with the first perimeter portion; and
        a second support body including a second perimeter portion disposed on the second surface of the door body and coupled to the first perimeter portion with the door body disposed between the first and second perimeter portions.

2. The access door of claim 1, wherein the first and second support bodies respectively include first and second support body apertures adapted to receive a fastener to couple the first and second support bodies together and to the door body.

3. The access door of claim 1, further comprising a latch disposed on the door body and adapted to selectively retain the access door in a closed position.

4. The access door of claim 1, wherein the first perimeter portion includes a first side facing towards the door body, and the first support body further includes a rib extending from the first side and disposed in the door body aperture laterally between the door body and the view body.

5. The access door of claim 1, wherein the first support body includes first support body apertures adapted to respectively receive fasteners to couple the first support body to the door body.

6. The access door of claim 1, wherein the view body includes view body apertures adapted to respectively receive fasteners to couple the view body to the first support body.

7. The access door of claim 1, wherein the view body is composed of one of glass and transparent plastic.

8. The access door of claim 7, wherein the view body is adapted to reflect and control sunlight penetration.

9. The access door of claim 7, wherein the view body is an acrylic that includes reflective nanoparticles that reflect and block approximately 50% of Infrared Radiation caused by sunlight.

10. The access door of claim 1, wherein the view body is tinted.

11. The access door of claim 1, wherein the view body includes a fog restrictive coating.

12. The access door of claim 1, wherein the first support body includes a rim disposed in the door body aperture and the recess receives the rim.

13. The access door of claim 1, wherein the first support body includes a first support body ventilation aperture and the view body includes a view body ventilation cutout.

14. A view port for a fish storage container, wherein the fish storage container incudes a surface having opposing first and second sides and an opening, the view port comprising:
    a first support body including a first perimeter portion adapted to be disposed on the first side of the surface;
    a view body coupled to the first support body and adapted to be disposed in the opening, wherein the view body is composed of a transparent or translucent material and includes a recess that is adapted to receive the first support body to allow an exterior surface of the view body to be substantially flush with the first perimeter portion; and
    a second support body including a second perimeter portion adapted to be disposed on the second side of the surface and coupled to the first perimeter portion with the surface disposed between the first and second perimeter portions.

15. The view port of claim 14, wherein the first perimeter portion includes a first perimeter side adapted to face towards the first side of the surface, and the first support body further incudes a rib extending from the first perimeter side and adapted to be disposed in the opening laterally between the view body and the surface.

16. The view port of claim 14, wherein the view body is composed of one of glass and transparent plastic and is adapted to reflect and control sunlight penetration.

17. The view port of claim 14, wherein the view body is an acrylic that includes reflective nanoparticles that reflect and block approximately 50% of Infrared Radiation.

18. The view port of claim 14, wherein the view body is tinted and includes a fog restrictive coating.

19. The view port of claim 14, wherein the first support body includes a rim adapted to be disposed in the opening, and the recess receives the rim.

20. The view port of claim 14, wherein the first support body includes a first support body ventilation aperture, and the view body includes a view body ventilation cutout.

21. A fish storage container, comprising:
a surface having opposing first and second sides and an opening; and
a view port including:
  a first support body having a first perimeter portion disposed on the first side;
  a view body disposed in the opening and coupled to the first support body, wherein the view body is composed of a transparent or translucent material, and includes a recess that is adapted to receive the first support body to allow an exterior surface of the view body to be substantially flush with the first perimeter portion; and
  a second support body including a second perimeter portion disposed on the second side and coupled to the first perimeter portion with the surface disposed between the first and second perimeter portions.

22. The fish storage container of claim 21, wherein the view body is adapted to reflect and control sunlight penetration.

23. The fish storage container of claim 21, wherein the view body is an acrylic that includes reflective nanoparticles that reflect and block approximately 50% of Infrared Radiation caused by sunlight.

24. The fish storage container of claim 21, wherein the view body includes a fog restrictive coating.

* * * * *